(12) United States Patent
Zhou et al.

(10) Patent No.: US 12,344,793 B1
(45) Date of Patent: Jul. 1, 2025

(54) DIVALENT-BRINE-BASED HIGH DENSITY DRILLING FLUIDS

(71) Applicant: Halliburton Energy Services, Inc., Houston, TX (US)

(72) Inventors: Hui Zhou, Houston, TX (US); Preston Andrew May, Houston, TX (US); Ayten Rady, Houston, TX (US); Mohamed Metwally, Houston, TX (US)

(*) Notice: Subject to any disclaimer, the term of this patent is extended or adjusted under 35 U.S.C. 154(b) by 0 days.

(21) Appl. No.: 18/629,458

(22) Filed: Apr. 8, 2024

(51) Int. Cl.
*E21B 43/04* (2006.01)
*C09K 8/12* (2006.01)
*E21B 21/00* (2006.01)

(52) U.S. Cl.
CPC .............. *C09K 8/12* (2013.01); *E21B 21/003* (2013.01); *E21B 43/04* (2013.01)

(58) Field of Classification Search
CPC .......... C09K 8/12; E21B 43/04; E21B 21/003
USPC ........................................................ 175/65
See application file for complete search history.

(56) References Cited

U.S. PATENT DOCUMENTS

| | | | |
|---|---|---|---|
| 10,336,850 B2 | 7/2019 | Zha et al. | |
| 10,858,566 B2 | 12/2020 | Favero et al. | |
| 10,883,037 B2 | 1/2021 | Zhou et al. | |
| 10,968,380 B2 | 4/2021 | Panamarathupalayam | |
| 11,746,275 B2 | 9/2023 | Linscombe | |
| 2005/0199428 A1* | 9/2005 | Dixon | C09K 8/04 507/100 |
| 2006/0180310 A1* | 8/2006 | Welton | C09K 8/68 166/283 |
| 2007/0102154 A1* | 5/2007 | Grott | C02F 1/42 166/266 |
| 2015/0191640 A1 | 7/2015 | Lee et al. | |
| 2017/0198189 A1 | 7/2017 | Panamarathupalayam | |
| 2020/0255716 A1* | 8/2020 | Favero | C09K 8/12 |
| 2020/0369938 A1* | 11/2020 | Linscombe | C09K 8/08 |
| 2022/0340803 A1 | 10/2022 | Eyaa Allogo et al. | |
| 2023/0357622 A1 | 11/2023 | Linscombe | |

* cited by examiner

*Primary Examiner* — William D Hutton, Jr.
*Assistant Examiner* — Ashish K Varma
(74) *Attorney, Agent, or Firm* — The Hilton Firm PLLC

(57) ABSTRACT

Drilling fluids and methods for drilling a wellbore. An example drilling fluid is a divalent brine aqueous base fluid having at least one dissolved divalent zinc salt and also a polymeric additive that is a cross-linked copolymer comprising a first comonomer of 2-acrylamido-2-methylpropanesulfonic acid in a first comonomer concentration of at least 50 mol % of the copolymer; wherein the polymeric additive additionally comprises a second comonomer comprising a N-vinyl amine-containing monomer, a terminal double bound-containing monomer, or a combination of a N-vinyl amine-containing monomer and a terminal double bound-containing monomer; wherein the second comonomer is present in a total second comonomer concentration of 50 mol % or less of the copolymer. The drilling fluid further includes a zinc solid.

20 Claims, 2 Drawing Sheets

US 12,344,793 B1

DIVALENT-BRINE-BASED HIGH DENSITY DRILLING FLUIDS

TECHNICAL FIELD

The present disclosure relates generally to wellbore operations, and more particularly, to the use of a polymeric additive in combination with a zinc solid to provide fluid loss control and sufficient rheology to a divalent salt brine-based drilling fluids.

BACKGROUND

Natural resources such as gas, oil, and water residing in a subterranean formation may be recovered by drilling a wellbore down to the subterranean formation while circulating a drilling fluid in the wellbore. The drilling fluid may possess various properties that may be beneficial to the drilling of the subterranean formation. For example, the drilling fluid may possess a density sufficient to carry the cuttings of the subterranean formation to the surface. Further, the drilling fluid may form a filter cake on the walls of the wellbore to prevent the loss of the fluid portion of the drilling fluid to the surrounding subterranean formation. Zinc-containing brines may be preferred as the base fluid for some drilling fluid formulations because of their higher densities. However, not all drilling fluid additives may be compatible with drilling fluids using zinc-containing brines as the base fluid. Moreover, it is common to increase density in some drilling fluid formulations with weighting agents. However, to achieve very high densities a large volume of weighting agents may be required, which may undesirably increase the fluid rheology.

The use of the drilling fluid is an important part of wellbore construction. The present disclosure provides improved drilling fluids for the drilling of a subterranean formation.

BRIEF DESCRIPTION OF THE DRAWINGS

Illustrative examples of the present disclosure are described in detail below with reference to the attached drawing figures, which are incorporated by reference herein, and wherein.

Figure 1:
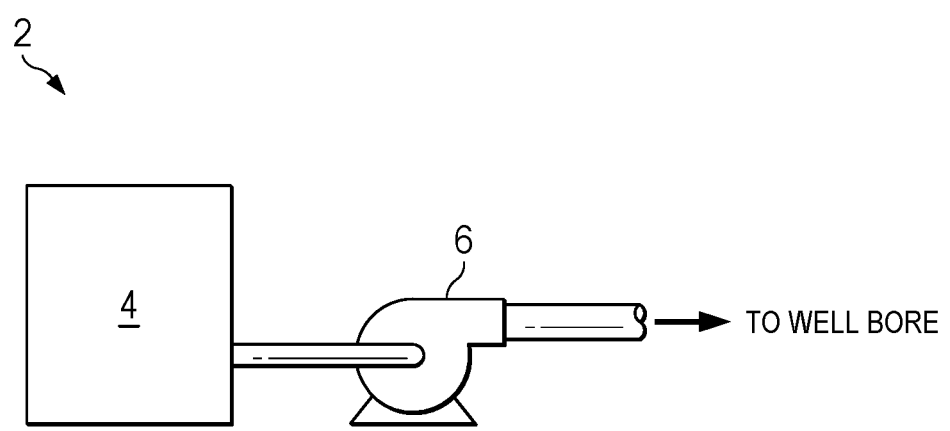
FIG. 1 illustrates a schematic of the preparation of a drilling fluid in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to wellbore operations, and more particularly, to the use of a polymeric additive in combination with a zinc solid to provide fluid loss control and sufficient rheology to divalent salt brine-based drilling fluids.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present disclosure. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms "uphole" and "downhole" may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The terms "upstream" and "downstream" may be used to refer to the location of various components relative to one another in regards to the flow of a sample through said components. For example, a first component described as upstream from a second component will encounter a sample before the downstream second component encounters the sample. Similarly, a first component described as being downstream from a second component will encounter the sample after the upstream second component encounters the sample.

As used herein the weight/volume percentage ("w/v") is to be understood to mean the grams/100 milliliters.

The present disclosure relates generally to wellbore operations, and more particularly, to the use of a polymeric additive in combination with a zinc solid to provide fluid loss control and sufficient rheology to divalent salt brine-based drilling fluids. Advantageously, the drilling fluids are prepared with a polymeric addictive and a zinc solid that are both compatible with the use of zinc-containing brines for the base fluid. The polymeric additive may be used to increase viscosity and provide fluid loss control to the drilling fluid. The zinc solids may be used to adjust the drilling fluid rheology and increase viscosity in combination with the polymeric additive. As a further advantage, the use of zinc-containing brines as the base fluid in combination with the polymeric additive and the zinc solid allows for the drilling fluids to reach very high densities while maintaining sufficient rheology and fluid loss control. Moreover, the drilling fluids are compatible with subsequently introduced fluids that also may utilize zinc-containing brines such as screen-running fluids and/or gravel packing fluids. A still further advantage is that there is an observed synergism between the polymeric additive and the zinc solids. The combination of the polymeric additive and the zinc solids provide the desired fluid properties without needing high volumes of solid weighting agents which may negatively affect the rheology of the drilling fluid.

The drilling fluids comprise a polymeric additive. The polymeric additive may be used in the drilling fluid to provide a desired fluid rheology and sufficient fluid loss control to the drilling fluid. The polymeric additive is compatible with zinc-containing brines and is used to provide the desired fluid properties when these zinc-containing brines are used as the base fluid of the drilling fluid. The polymeric additive is also one part of a synergistic combination with a zinc solid. These two components, when used with zinc-containing brines, produce a drilling fluid with a very high density, sufficient rheology, and sufficient fluid loss control without the need for high volumes of weighting agents.

The polymeric additive is a cross-linked copolymer having 2-acrylamido-2-methylpropanesulfonic acid as a comonomer in a concentration of 50 mol % or greater. Generally, the polymeric additive additionally comprises at least one second comononer comprising an N-vinyl amine-containing monomer, a terminal double bound-containing monomer, or any combination of an N-vinyl amine-containing monomer and a terminal double bound-containing monomer. More specifically, the polymeric additive comprises at least one additional comonomer selected from the group including, but not limited to, N-vinylpyrrolidone, N-vinylamides (such as N-vinylformamide, N-vinylacetamide, N-vinyl-N-methylacetamide, N-vinylcaprolactam, and N-vinylpiperidone), acrylamide, methacrylamide, N-substituted acrylamides (such as N-methylacrylamide, N-ethylacrylamide, N-isopropylacrylamide, N,N-dimethylacrylamide, diacetone acrylamide, methylol acrylamide, N-hydroxyethylacrylamide, and dimethylaminopropyl acrylamide), methacrylamide, N-substituted methacrylamides (such as dimethylaminopropyl methacrylamide), acrylates (such as methyl acrylate and hydroxyethyl acrylate), methacrylates (such as methyl methacrylate, 2-hydroxyethyl methacrylate, and 2-dimethylaminoethyl methacrylate), acrylic acid, methacrylic acid, N-allylamides, vinyl alcohol, vinyl ethers (such as vinyl ethyl ether, ethylene glycol monovinyl ether, polyethylene glycol monovinyl ether, and glycerol monovinyl ether), vinyl esters (such as vinyl acetate), allyl alcohol, allyl ethers (such as sodium 3-allyloxy-2-hydroxypropane-1-sulfonate, glycerol monoallyl ether, ethylene glycol monoallyl ether, and polyethylene glycol monoallyl ether), allyl esters (such as allyl acetate), vinylpyridine, vinyl sulfonates (such as sodium vinylsulfonate and sodium vinylbenzene sulfonate), allyl sulfonates, vinylimidazole, allylimidazole, allylamine, allyltrimethylammonium halide, diallylamine, diallyldimethylammonium halide, and diallyldialkylammonium halide, or any combination of additional monomers. The second comonomer or comonomers are present in the polymeric additive copolymer in a total second comonomer concentration of 50 mol % or less.

The concentration of the polymeric additive in a drilling fluid may range from about 0.1% w/v to about 10% w/v. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the polymeric additive in the drilling fluid may range from about 0.1% (w/v) to about 10% (w/v), from about 0.5% (w/v) to about 10% (w/v), from about 1% (w/v) to about 10% (w/v), from about 2% (w/v) to about 10% (w/v), from about 3% (w/v) to about 10% (w/v), from about 4% (w/v) to about 10% (w/v), from about 5% (w/v) to about 10% (w/v), from about 6% (w/v) to about 10% (w/v), from about 7% (w/v) to about 10% (w/v), from about 8% (w/v) to about 10% (w/v), or from about 9% (w/v) to about 10% (w/v). As another example, the concentration of the polymeric additive in the drilling fluid may range from about 0.1% (w/v) to about 10% (w/v), from about 0.1% (w/v) to about 9% (w/v), from about 0.1% (w/v) to about 8% (w/v), from about 0.1% (w/v) to about 7% (w/v), from about 0.1% (w/v) to about 6% (w/v), from about 0.1% (w/v) to about 5% (w/v), from about 0.1% (w/v) to about 4% (w/v), from about 0.1% (w/v) to about 3% (w/v), from about 0.1% (w/v) to about 2% (w/v), from about 0.1% (w/v) to about 1% (w/v), or from about 0.1% (w/v) to about 0.5% (w/v). With the benefit of this disclosure, one of ordinary skill in the art will be readily able to prepare and select a polymeric additive having a desirable concentration for use in a given drilling fluid.

The polymeric additive may comprise one or more crosslinkers. The crosslinker may be any crosslinker having at least two olefinic bonds. Conjugated olefinic bonds may also be suitable (e.g., dienes). For example, the crosslinker may be a crosslinker having at least two vinyl groups; at least two allyl groups; at least two acrylate groups; at least two methacrylate groups; at least two acrylamide groups; at least two methacrylamide groups; and/or at least two groups from at least two of a vinyl group, an allyl group, an acrylate group, a methacrylate group, an acrylamide group, and a methacrylamide group. Any combination of these groups may also be used in forming the crosslinked polymeric additive of the present disclosure.

Examples of suitable crosslinkers having at least two vinyl groups may include, but are not limited to, divinyl ether; a divinyl ester; a divinyl ether of a polyglycol; a divinyl ether of a polyol; a vinyl ether of a polyol; ethylene glycol divinyl ether; triethylene glycol divinyl ether; poly (ethylene glycol) divinyl ether; 1,3-divinyl-2-imidazolidinone; divinylbenzene; ethylidene pyrrolidone; ethylidene bis(N-vinylpyrrolidone); N-vinyl-3(E)-ethylidene pyrrolidone; and any combination thereof.

Examples of suitable crosslinkers having at least two allyl groups may include, but are not limited to, diallyl ether; a diallyl ester; an allyl ether of a polyglycol; an allyl ether of a polyol; triallyl amine; triallyl alkylammonium halide; tetraallylammonium halide; and tetraallylethylene diamine; pentaerythritol allyl ether; trimethylolpropane diallyl ether; ethylene glycol diallyl ether; glycerol diallyl ether; triallyl-1,3,5-triazine-2,4,6-trione; 2,4,6-triallyloxy-1,3,5-triazine; and any combination thereof.

Examples of suitable crosslinkers having at least two acrylate groups may include, but are not limited to, ethylene glycol diacrylate; diethylene glycol diacrylate; triethylene glycol diacrylate; pentaerythritol triacrylate; pentaerythritol tetraacrylate; 1,1,1-trimethylolpropane triacrylate; 1,6-hexanediol diacrylate; and any combination thereof.

Examples of suitable crosslinkers having at least two methacrylate groups may include, but are not limited to, ethylene glycol dimethacrylate; poly(ethylene glycol) dimethacrylate; 1,1,1-trimethylolpropane trimethacrylate; pentaerythritol trimethacrylate; pentaerythritol tetramethacrylate; and any combination thereof.

Examples of suitable crosslinkers having at least two acrylamide groups may include, but are not limited to, N,N'-substituted bisacrylamide; N,N'-methylenebis(acrylamide); and any combination thereof.

Examples of suitable crosslinkers having at least two methacrylamide groups may include, but are not limited to, N,N'-ethylenebis(2-methylacrylamide); 1,4-dimethacrylolpiperazine; N,N'-methylenebis(2-methylacrylamide); 1,6-hexamethylene bis(2-methylacrylamide); and any combination thereof.

Examples of suitable crosslinkers having at least two groups from at least two of a vinyl group, an allyl group, an acrylate group, a methacrylate group, an acrylamide group, and a methacrylamide group may include, but are not limited to, an allyl acrylate (i.e., having an allyl group and an acrylate group); N,N-diallylacrylamide (i.e., having two allyl group and an acrylamide group); N-vinylacrylamide (i.e., having a vinyl group and an acrylamide group); and any combination thereof.

The crosslinker may be present in the polymeric additive in a concentration of about 0.05 mol % to about 15 mol % of the total monomeric units of the polymer(s).

The polymeric additive may be provided in the form of a dry powder or in the form of a water-in-oil emulsion, which may then be used, for example, to formulate a drilling fluid for use in a drilling operation. In the case of a water-in-oil emulsion, the polymeric additive may comprise a microgel dispersed in a continuous oil phase.

The polymeric additive may provide desirable viscosity and fluid-loss control under well circulating conditions at temperatures of up to 260° C. (500° F.). In addition, the polymeric additive may provide such desirable rheological properties without the need of clay being included in the drilling fluid.

The drilling fluids described herein comprise a zinc solid. Examples of the zinc solid include, but are not limited to, zinc carbonate, zinc carbonate basic (zinc hydroxide carbonate), zinc hydroxide, zinc oxide, zinc phosphate, zinc oxalate, zinc sulfide, or a combination of zinc solids. The zinc solid may be included in the drilling fluid to adjust the rheology of the drilling fluid and to increase the viscosity of the drilling fluid. The zinc solids provide a synergistic response in these properties when used in combination with the polymeric additive. This combination reduces the need to add substantial volumes of weighting agents, such as barite, ilmenite, hematite, or manganese tetroxide, to adjust fluid properties. In some examples, no additional weighting agents, such as barite, ilmenite, hematite, or manganese tetroxide are included in the drilling fluid. In some examples, the fluid rheology and viscosity are adjusted only by the combination of the polymeric additive and the zinc solids. Unlike the zinc salts used to form the brine of the aqueous base fluid, the zinc solids are not readily soluble in the aqueous base fluid and have very low solubility or may be insoluble in the aqueous base fluid. In some examples, the zinc solids have a particle size in a range of about 10 nm to about 100 μm. For example, the zinc solids may have a mean particle size ranging from about 10 nm to about 100 μm, about 50 nm to about 50 μm, or about 100 nm to about 10 μm. In some examples, the zinc solids have a unimodal distribution of particle sizes. In other examples, the zinc solids have a multimodal distribution of particle sizes.

The concentration of the zinc solids in a drilling fluid may range from about 1% w/v to about 50% w/v. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the zinc solids in the drilling fluid may range from about 1% (w/v) to about 50% (w/v), from about 2% (w/v) to about 50% (w/v), from about 3% (w/v) to about 50% (w/v), from about 4% (w/v) to about 50% (w/v), from about 5% (w/v) to about 50% (w/v), from about 6% (w/v) to about 50% (w/v), from about 7% (w/v) to about 50% (w/v), from about 8% (w/v) to about 50% (w/v), from about 9% (w/v) to about 50% (w/v), from about 10% (w/v) to about 50% (w/v), from about 20% (w/v) to about 50% (w/v), from about 30% (w/v) to about 50% (w/v), or from about 40% (w/v) to about 50% (w/v). As another example, the concentration of the zinc solids in the drilling fluid may range from about 1% (w/v) to about 50% (w/v), from about 1% (w/v) to about 45% (w/v), from about 1% (w/v) to about 40% (w/v), from about 1% (w/v) to about 35% (w/v), from about 1% (w/v) to about 30% (w/v), from about 1% (w/v) to about 25% (w/v), from about 1% (w/v) to about 20% (w/v), from about 1% (w/v) to about 15% (w/v), from about 1% (w/v) to about 10% (w/v), from about 1% (w/v) to about 9% (w/v), from about 1% (w/v) to about 8% (w/v), from about 1% (w/v) to about 7% (w/v), from about 1% (w/v) to about 6% (w/v), from about 1% (w/v) to about 5% (w/v), from about 1% (w/v) to about 4% (w/v), from about 1% (w/v) to about 3% (w/v), or from about 1% (w/v) to about 2% (w/v). With the benefit of this disclosure, one of ordinary skill in the art will be readily able to prepare and select a zinc solid having a desirable concentration for use in a given drilling fluid.

The drilling fluids described herein comprise a divalent brine aqueous base fluid comprising at least one dissolved divalent zinc salt. The divalent brine aqueous base fluid has a fluid portion sourced from freshwater, saltwater (e.g., water containing one or more salts dissolved therein), brine (e.g., saturated saltwater, including saturated saltwater produced from subterranean formations), seawater, or any combination thereof. Generally, the aqueous base fluid may be from any source provided that the aqueous base fluid does not contain an excess of compounds that may undesirably affect other components in the treatment fluid. Suitable examples of divalent brines can include, for example, magnesium chloride brines, calcium chloride brines, calcium bromide brines, zinc bromide brines, and the like.

If the fluid portion of the aqueous base fluid is not already a divalent brine comprising at least one dissolved divalent zinc salt, then a divalent zinc salt may be combined with the fluid portion and dissolved therein to form the aqueous base fluid. Where used, the dissolved salt may be included in the drilling fluid for many purposes, including, but not limited to, densifying a drilling fluid to a chosen density. A mixture of one or more dissolved salts may be used in some instances. Suitable divalent salts may include, but are not limited to, calcium bromide, zinc bromide, calcium chloride, manganese bromide, manganese chloride, zinc chloride, calcium nitrate, calcium iodide, and mixtures thereof. In a specific example, the aqueous base fluid is a zinc bromide divalent brine. In another specific example, the aqueous base fluid is a calcium bromide and zinc bromide divalent brine. One of ordinary skill in the art, with the benefit of this disclosure, should be readily able to select an aqueous base fluid for a chosen application.

The concentration of the aqueous base fluid in the drilling fluid may range from about 1% (w/v) to about 99% (w/v). The concentration of the aqueous base fluid in the drilling fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the aqueous base fluid in the drilling fluid may range from about 1% (w/v) to about 99% (w/v), from about 5% (w/v) to about 99% (w/v), from about 10% (w/v) to about 99% (w/v), from about 15% (w/v) to about 99% (w/v), from about 20% (w/v) to about 99% (w/v), from about 25% (w/v) to about 99% (w/v), from about 30% (w/v) to about 99% (w/v), from about 35% (w/v) to about 99% (w/v), from about 40% (w/v) to about 99% (w/v), from about 45% (w/v) to about 99% (w/v), from about 55% (w/v) to about 99% (w/v), from about 60% (w/v) to about 99% (w/v), from about 65% (w/v) to about 99% (w/v), from about 70% (w/v) to about 99% (w/v), from about 75% (w/v) to about 99% (w/v), from about 80% (w/v) to about 99% (w/v), from about 85% (w/v) to about 99% (w/v), from about 90% (w/v) to about 99% (w/v), or from about 95% (w/v) to about 99% (w/v). As another example, the concentration of the aqueous base fluid in the drilling fluid may range from about 1% (w/v) to about 99% (w/v), from about 1% (w/v) to about 95% (w/v), from about 1% (w/v) to about 90% (w/v), from about 1% (w/v) to about 85% (w/v), from about 1% (w/v) to about 80% (w/v), from about 1% (w/v) to about 75% (w/v), from about 1% (w/v) to about 70% (w/v), from about 1% (w/v) to about 65% (w/v), from about 1% (w/v) to about 60% (w/v), from about 1% (w/v) to about 55% (w/v), from about 1% (w/v) to about 50% (w/v), from about 1% (w/v) to about 45% (w/v), from about 1% (w/v) to about 40% (w/v), from about 1% (w/v) to about 35% (w/v), from about 1% (w/v) to about 30% (w/v), from about 1% (w/v) to about 25% (w/v), from about 1% (w/v) to about 20% (w/v), from about 1% (w/v) to about 15% (w/v), from about 1% (w/v) to about 10% (w/v), or from about 1% (w/v) to about 5% (w/v). With the benefit of this disclosure, one of ordinary skill in the art will be able to prepare a treatment fluid having a sufficient concentration of an aqueous base fluid for a given application.

Some optional examples of the drilling fluids may also include weighting agents to increase the density of the drilling fluids. By way of example, weighting agents may have a specific gravity of about 2 or higher (e.g., about 2, about 4, etc.). Suitable weighting agents may include, but are not limited to, calcium carbonate, magnesium carbonate, iron carbonate, hematite, ilmenite, hausmannite, barite, manganese tetroxide, or combinations thereof. In some examples, weighting agents are not included in the drilling fluids.

In some optional examples, the drilling fluids may further comprise an additional additive. The additional additive may be used to adjust a property of the drilling fluid, for example, viscosity, density, etc. Examples of the additives include, but are not limited to, silica scale control additives, corrosion inhibitors, surfactants, gel stabilizers, anti-oxidants, polymer degradation prevention additives, relative permeability modifiers, scale inhibitors, iron control agents, particulate diverters, salts, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, hydrate inhibitors, consolidating agents, bactericides, clay stabilizers, breakers, delayed release breakers, the like, or any combination thereof. With the benefit of this disclosure, one of ordinary skill in the art and the benefit of this disclosure will be able to formulate a drilling fluid having properties suitable for a desired application.

The drilling fluids have a density suitable for a particular application. By way of example, the drilling fluids may have a density in a range of from about 9 pounds per gallon ("lb/gal") to about 20 lb/gal, in a range of from about 12 lb/gal to about 20 lb/gal, or in a range of from about 14 lb/gal to about 20 lb/gal. With the benefit of this disclosure, those of ordinary skill in the art will readily recognize the appropriate density of a drilling fluid for a particular application.

Subsequent to the introduction of the drilling fluids disclosed herein, a zinc-containing fluid may be introduced into the wellbore. The zinc-containing fluid may be introduced as a treatment fluid for a variety of wellbore operations including, but not limited to, a screen running fluid and/or a gravel packing fluid. The zinc-containing fluid may have a density of 14.5 lb/gal to about 20 lb/gal in some examples. In some examples, the zinc content in the zinc-containing fluid may range from about 3 wt. % to about 75 wt. % and encompassing any value(s) in between. Screen running fluids may be used after the well is drilled. The drilling fluid is first displaced or modified to be a low/no solids drilling fluid. Then one or more sand screens may be introduced into the wellbore with the screen running fluid. The screen running fluid is used to place the sand screens at a desired location. The screen running fluid may be heavier than the drilling fluid (e.g., 0.3-0.5 lb/gal more) and is used after the drilling fluid. The screen running fluid is preferred to be solids free, but may comprise solids for adjustment of the density and/or viscosity. A gravel packing fluid may be used to deliver sized sand that may act as a filter medium between the subterranean formation and a sand screen. The sand screens may be run alone (e.g., as with a standalone screen) or with the gravel depending on the well.

FIG. 1 illustrates a schematic of the preparation of a drilling fluid in accordance with the examples disclosed herein. A system 2 is used for the preparation of a drilling fluid and the delivery of the drilling fluid to a wellbore. As shown, the drilling fluid may be prepared by mixing an aqueous base fluid, a polymeric additive, and a zinc solid in mixing equipment 4, which may be a jet mixer, re-circulating mixer, or a batch mixer. The drilling fluid may then be pumped via pumping equipment 6 to the wellbore. In some examples, the mixing equipment 4 and the pumping equipment 6 may be disposed on one or more mixing trucks as will be apparent to those of ordinary skill in the art. In some examples, a jet mixer may be used, for example, to continuously mix the polymeric additive and zinc solid with the aqueous base fluid as it is being pumped into the wellbore.

It should be clearly understood that the example system illustrated by FIG. 1 is merely a general application of the principles of this disclosure in practice, and a wide variety of other examples are possible. Therefore, the scope of this disclosure is not limited in any manner to the details of FIG. 1 as described herein.

Figure 2:
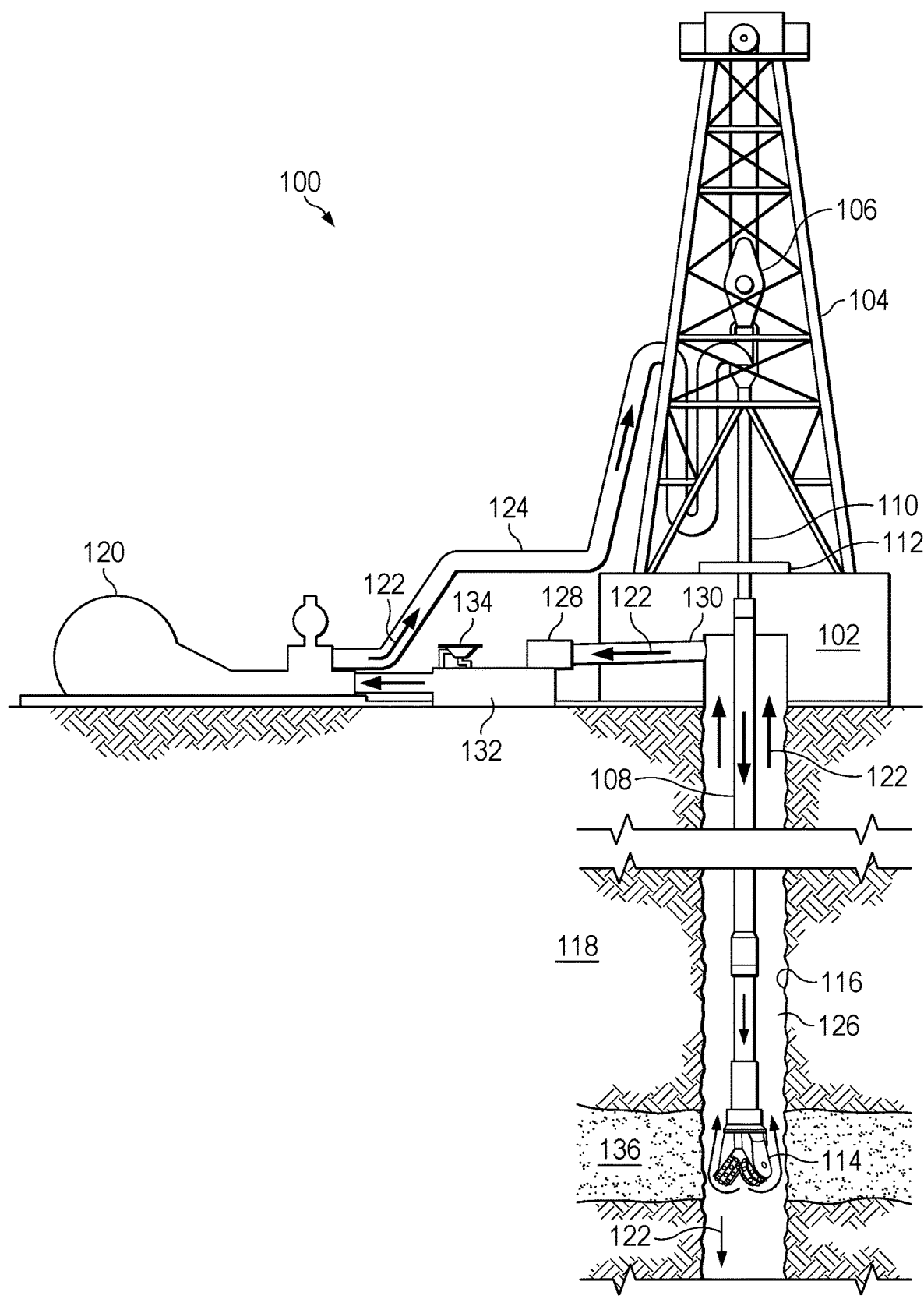
FIG. 2 illustrates a schematic of a drilling assembly in which a drilling fluid is used in accordance with one or more examples described herein.

FIG. 2 illustrates a schematic of a drilling assembly 100 in which a drilling fluid 122 as disclosed above may be used. It should be noted that while FIG. 2 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end of the drill string 108 and may be driven either by a downhole motor and/or via rotation of the drill string 108 from the well surface. The drill bit 114 may include, but is not limited to, roller cone bits, PDC bits, natural diamond bits, any hole openers, reamers, coring bits, etc. As the drill bit 114 rotates, it may create a wellbore 116 that penetrates various subterranean formations 118. In an embodiment, the drill bit 114 may penetrate reservoir section 136 and a drilling fluid 122, as disclosed herein, may be circulated in the wellbore 116 during the drilling of the reservoir section 136.

The drilling fluid 122 comprises an aqueous base fluid comprising at least one dissolved divalent zinc salt, a polymeric additive, and a zinc solid. A pump 120 (e.g., a mud pump) may circulate the drilling fluid 122 through a feed pipe 124 and to the kelly 110, which conveys the drilling fluid 122 downhole through the interior of the drill string 108 and through one or more orifices in the drill bit 114 and into the wellbore 116 portion penetrating the reservoir section 136. The drilling fluid 122 may then be circulated back to the surface via an annulus 126 defined between the drill string 108 and the walls of the wellbore 116. At the surface, the recirculated or spent drilling fluid 122 may exit the annulus 126 and may be conveyed to one or more fluid processing unit(s) 128 via an interconnecting flow line 130. The fluid processing unit(s) 128 may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The fluid processing unit(s) 128 may further include one or more sensors, gauges, pumps, compressors, and the like used store, monitor, regulate, and/or recondition the drilling fluid 122.

After passing through the fluid processing unit(s) 128, a "cleaned" drilling fluid 122 may be deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. One or more drilling fluid additives may be added to the drilling fluid 122 via a mixing hopper 134 communicably coupled to or otherwise in fluid communication with the retention pit 132. In some examples, the drilling fluid additives comprise additional amounts of the polymeric additive and/or zinc solid that may be added to the drilling fluid 122 via the mixing hopper. The mixing hopper 134 may include, but is not limited to, mixers and related mixing equipment known to those skilled in the art. Alternatively, the drilling fluid additives may be added to the drilling fluid 122 at any other location in the drilling assembly 100. While FIG. 2 shows only a single retention pit 132, there could be more than one retention pit 132, such as multiple retention pits 132 in series. Moreover, the retention pit 132 may be representative of one or more fluid storage facilities and/or units where the drilling fluid additives may be stored, reconditioned, and/or regulated until added to the drilling fluid 122. In some optional examples, after the introduction of the drilling fluid 122, a zinc-containing fluid, such as a screen running fluid or gravel packing fluid, may be introduced into the wellbore 116 to perform a subsequent wellbore operation.

It should be clearly understood that the example system illustrated by FIG. 2 is merely a general application of the principles of this disclosure in practice, and a wide variety of other examples are possible. Therefore, the scope of this disclosure is not limited in any manner to the details of FIG. 2 as described herein.

To facilitate a better understanding of the present embodiments, the following examples of certain aspects of some embodiments are given. In no way should the following examples be read to limit, or define, the entire scope of the embodiments.

EXAMPLES

An experiment was conducted to evaluate the properties of drilling fluid formulations comprising the polymeric additive and a zinc solid. The effects of the zinc solid in combination with the polymeric additive is shown in Table 1. The polymeric additive is a crosslinked copolymer of 2-acrylamido-2-propanesulfonic acid (AMPS) and N-vinylpyrrolidone (NVP) as disclosed herein. After mixing, the drilling fluid was hot-rolled at 280° F. for 16 hours. Fluid rheology was measured before and after hot-rolling at 120° F. with a Fann™ Model 45 viscometer. Filter cake of the hot-rolled fluid was then built on a 10-micron ceramic disk at 500 psi differential pressure and 280° F. for 16 hours. The filtrate was collected in a graduated cylinder and recorded as the initial fluid loss without multiplying the volume by 2.

TABLE 1

| Drilling Fluids (16.5 lb/gal) with mixed $CaBr_2$/$ZnBr_2$ brine | | | |
|---|---|---|---|
| HTHP Drill-in Fluids | #1 (no zinc solid) | #2 | #3 |
| 14.2 lb/gal $CaBr_2$ brine (bbl) | 0.594 | 0.560 | 0.560 |
| 19.2 lb/gal $ZnBr_2$ brine (bbl) | 0.178 | 0.326 | 0.326 |
| Polymeric Additive (lb/bbl) | 12.0 | 12.0 | 12.0 |
| Alkalinity Agent (lb/bbl) | 3.0 | 3.0 | 3.0 |
| Bridging Agent 1(lb/bbl) | 90.0 | 20.0 | 20.0 |
| Bridging Agent 2(lb/bbl) | 90.0 | 20.0 | 20.0 |
| Zinc Carbonate (lb/bbl) | — | 40.0 | — |
| Zinc Carbonate Basic (lb/bbl) | — | — | 40.0 |
| Magnesium Peroxide (lb/bbl) | 1.0 | 1.0 | 1.0 |
| Oxygen Scavenger 1 (lb/bbl) | 0.1 | 0.1 | 0.1 |
| Oxygen Scavenger 2 (lb/bbl) | 0.5 | 0.5 | 0.5 |

Hot-roll at 280° F. for 16 hours

TABLE 1-continued

Drilling Fluids (16.5 lb/gal) with mixed CaBr$_2$/ZnBr$_2$ brine

| HTHP Drill-in Fluids | #1 (no zinc solid) | | #2 | | #3 | |
|---|---|---|---|---|---|---|
| Fluid Rheology @ 120° F. | BHR | AHR | BHR | AHR | BHR | AHR |
| 600 rpm | 36 | 47 | 24 | 80 | 48 | 87 |
| 300 rpm | 20 | 25 | 12 | 53 | 26 | 61 |
| 200 rpm | 14 | 18 | 8 | 42 | 18 | 50 |
| 100 rpm | 9 | 9 | 4 | 29 | 10 | 37 |
| 6 rpm | 2 | 2 | 0 | 5 | 2 | 11 |
| 3 rpm | 2 | 2 | 0 | 3 | 2 | 8 |

TABLE 1-continued

Drilling Fluids (16.5 lb/gal) with mixed CaBr$_2$/ZnBr$_2$ brine

| HTHP Drill-in Fluids | #1 (no zinc solid) | | #2 | | #3 | |
|---|---|---|---|---|---|---|
| 10 sec gel (lb/100 ft$^2$) | 5 | 4 | 0 | 3 | 3 | 8 |
| 10 min gel (lb/100 ft$^2$) | 17 | 11 | 4 | 4 | 10 | 8 |
| Plastic Viscosity (cp) | 16 | 22 | 12 | 27 | 22 | 26 |
| Yield Point (lb/100 ft$^2$) | 4 | 3 | 0 | 26 | 4 | 35 |
| HTHP fluid loss at 280° F. for 16 hours | | | | | | |
| HTHP filtrate @ 280° F. (mL) | Not tested | | 24 | | 13 | |

BHR: Before hot-rolling;
AHR: After hot-rolling

As shown in Table 1, Fluid #1 (without a zinc solid) was very thin even after hot-rolling. Fluid #2 with zinc carbonate was also thin before hot-rolling, but rheology picked up after hot-rolling. Fluid #3 with zinc carbonate basic showed better fluid rheology than zinc carbonate both before and after hot-rolling. Fluids #2 and #3 also showed very good HTHP fluid loss at 24 mL and 13 mL, respectively, after 16 hours. The results show that the polymer additive can provide very good fluid rheology and HTHP fluid loss control with the help of zinc carbonate or zinc carbonate basic in the mixed CaBr$_2$/ZnBr$_2$ brine.

Table 2 shows new formulations of the drilling fluid with an adjusted amount of polymer additive and zinc carbonate basic. Again, the polymeric additive was able to provide very good rheology and high-temperature, high-pressure fluid loss control with the addition of zinc carbonate basic. The fluid properties may be adjusted by changing the amounts of these components.

TABLE 2

Drilling Fluids (16.5 lb/gal) with different amounts of zinc carbonate basic and the polymeric additive.

| HTHP Drill-in Fluids | #4 | #5 | #6 | #7 |
|---|---|---|---|---|
| 14.2 lb/gal CaBr$_2$ brine (bbl) | 0.560 | 0.574 | 0.583 | 0.571 |
| 19.2 lb/gal ZnBr$_2$ brine (bbl) | 0.326 | 0.317 | 0.289 | 0.306 |
| Polymeric Additive (lb/bbl) | 12.0 | 10.0 | 10.0 | 10.0 |
| Alkalinity Agent (lb/bbl) | 3.0 | 3.0 | 3.0 | 3.0 |
| Bridging Agent 1(lb/bbl) | — | — | 20.0 | 20.0 |
| Bridging Agent 2(lb/bbl) | 20.0 | 20.0 | 20.0 | 20.0 |
| Bridging Agent 3(lb/bbl) | 20.0 | 20.0 | 20.0 | 20.0 |
| Zinc Carbonate Basic (lb/bbl) | 40.0 | 40.0 | 40.0 | 30.0 |
| Magnesium Peroxide (lb/bbl) | 1.0 | 1.0 | 1.0 | 1.0 |
| Oxygen Scavenger 1 (lb/bbl) | 0.1 | 0.1 | 0.1 | 0.1 |
| Oxygen Scavenger 2 (lb/bbl) | 0.5 | 0.5 | 0.5 | 0.5 |
| Hot-roll at 280° F. for 16 hours | | | | |
| Fluid Rheology @ 120° F. | BHR AHR | BHR AHR | BHR AHR | BHR AHR |
| 600 rpm | 63 79 | 57 64 | 67 79 | 60 50 |
| 300 rpm | 36 54 | 33 42 | 39 53 | 34 30 |
| 200 rpm | 27 44 | 24 33 | 29 43 | 25 22 |
| 100 rpm | 15 33 | 14 24 | 17 31 | 14 15 |
| 6 rpm | 3 14 | 5 9 | 5 12 | 4 7 |
| 3 rpm | 3 11 | 4 7 | 5 9 | 4 6 |
| 10 sec gel (lb/100 ft$^2$) | 7 11 | 7 7 | 9 9 | 8 7 |
| 10 min gel (lb/100 ft$^2$) | 12 11 | 7 7 | 9 9 | 11 8 |
| Plastic Viscosity (cp) | 27 25 | 24 22 | 28 26 | 26 20 |
| Yield Point (lb/100 ft$^2$) | 9 29 | 9 20 | 11 27 | 8 10 |
| HTHP fluid loss at 280° F. for 16 hours | | | | |
| HTHP filtrate @ 280° F. (mL) | 15.0 | 29.0 | 35.0 | 46.0 |

BHR: Before hot-rolling;
AHR: After hot-rolling

The drilling fluids disclosed herein may directly or indirectly affect one or more components or pieces of equipment associated with or which may come into contact with the drilling fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Provided are drilling fluids for drilling a wellbore in accordance with the disclosure and the illustrated FIGs. An example drilling fluid comprises a divalent brine aqueous base fluid comprising at least one dissolved divalent zinc salt, a polymeric additive that is a cross-linked copolymer comprising a first comonomer of 2-acrylamido-2-methylpropanesulfonic acid in a first comonomer concentration of at least 50 mol % of the copolymer; wherein the polymeric additive additionally comprises a second comonomer comprising a N-vinyl amine-containing monomer, a terminal double bound-containing monomer, or a combination of a N-vinyl amine-containing monomer and a terminal double bound-containing monomer; wherein the second comonomer is present in a total second comonomer concentration of 50 mol % or less of the copolymer. Wherein the drilling fluid further comprises a zinc solid.

Additionally or alternatively, the drilling fluids may include one or more of the following features individually or in combination. The divalent brine may comprise a divalent salt selected from the group consisting of calcium bromide, calcium chloride, calcium nitrate, calcium iodide, zinc bromide, zinc chloride, zinc nitrate, zinc iodide, and any combination thereof. The second comonomer of the polymeric additive may be a comonomer selected from the group consisting of N-vinylpyrrolidone, N-vinylamides, acrylamide, methacrylamide, N-substituted acrylamides, methacrylamide, N-substituted methacrylamides, acrylates, methacrylates, acrylic acid, methacrylic acid, N-vinylamides, N-allylamides, vinyl alcohol, vinyl ethers, vinyl esters, allyl alcohol, allyl ethers, allyl esters, vinylpyridine, vinyl sulfonates, allyl sulfonates, vinylimidazole, allylimidazole, allylamine, diallylamine, allyltrimethylammonium halide, diallyldimethylammonium halide, or any combination thereof. The polymeric additive may comprise a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallylammonium halide, tetraallylethylene diamine, N-vinyl-3(E)-ethylidene pyrrolidone, ethylidene bis(N-vinylpyrrolidone), and any combination thereof. The polymeric additive may be present in the drilling fluid in a concentration of about 0.1% to about 10% w/v of the drilling fluid. The zinc solid may comprise zinc carbonate, zinc carbonate basic, zinc hydroxide, zinc oxide, zinc phosphate, zinc oxalate, zinc sulfide, or a combination thereof. The zinc solids may have a particle size in a range of about 10 nm to about 100 μm. The drilling fluid may have a density of about 9 lb/gal to about 20 lb/gal. The drilling fluid may have a density of about 14.5 lb/gal to about 19.5 lb/gal.

Provided are methods for drilling a wellbore with a drilling fluid in accordance with the disclosure and the illustrated FIGs. An example method comprises providing a drilling fluid comprising a divalent brine aqueous base fluid comprising at least one dissolved divalent zinc salt, a polymeric additive that is a cross-linked copolymer comprising a first comonomer of 2-acrylamido-2-methylpropanesulfonic acid in a first comonomer concentration of at least 50 mol % of the copolymer; wherein the polymeric additive additionally comprises a second comonomer comprising a N-vinyl amine-containing monomer, a terminal double bound-containing monomer, or a combination of a N-vinyl amine-containing monomer and a terminal double bound-containing monomer; wherein the second comonomer is present in a total second comonomer concentration of 50 mol % or less of the copolymer, and a zinc solid. The method further comprises drilling a wellbore through at least a portion of a subterranean formation with the drilling fluid.

Additionally or alternatively, the method may include one or more of the following features individually or in combination. The method may further comprise introducing a zinc-containing fluid into the wellbore after the drilling fluid is introduced into the wellbore. The zinc-containing fluid may be a screen running fluid or a gravel packing fluid. The subterranean formation may comprise a reservoir comprising a hydrocarbon, and the wellbore may be drilled through at least a portion of the reservoir while the drilling fluid is circulated in the wellbore. The divalent brine may comprise a divalent salt selected from the group consisting of calcium bromide, calcium chloride, calcium nitrate, calcium iodide, zinc bromide, zinc chloride, zinc nitrate, zinc iodide, and any combination thereof. The second comonomer of the polymeric additive may be a comonomer selected from the group consisting of N-vinylpyrrolidone, N-vinylamides, acrylamide, methacrylamide, N-substituted acrylamides, methacrylamide, N-substituted methacrylamides, acrylates, methacrylates, acrylic acid, methacrylic acid, N-vinylamides, N-allylamides, vinyl alcohol, vinyl ethers, vinyl esters, allyl alcohol, allyl ethers, allyl esters, vinylpyridine, vinyl sulfonates, allyl sulfonates, vinylimidazole, allylimidazole, allylamine, diallylamine, allyltrimethylammonium halide, diallyldimethylammonium halide, or any combination thereof. The polymeric additive may comprise a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallylammonium halide, tetraallylethylene diamine, N-vinyl-3(E)-ethylidene pyrrolidone, ethylidene bis(N-vinylpyrrolidone), and any combination thereof. The polymeric additive may be present in the drilling fluid in a concentration of about 0.1% to about 10% w/v of the drilling fluid. The zinc solid may comprise zinc carbonate, zinc carbonate basic, zinc hydroxide, zinc oxide, zinc phosphate, zinc oxalate, zinc sulfide, or a combination thereof. The zinc solids may have a particle size in a range of about 10 nm to about 100 μm. The drilling fluid may have a density of about 9 lb/gal to about 20 lb/gal. The drilling fluid may have a density of about 14.5 lb/gal to about 19.5 lb/gal.

Provided are systems for drilling a wellbore with a drilling fluid in accordance with the disclosure and the illustrated FIGs. An example system comprises a drilling fluid comprising a divalent brine aqueous base fluid comprising at least one dissolved divalent zinc salt, a polymeric additive that is a cross-linked copolymer comprising a first comonomer of 2-acrylamido-2-methylpropanesulfonic acid in a first comonomer concentration of at least 50 mol % of the copolymer; wherein the polymeric additive additionally comprises a second comonomer comprising a N-vinyl amine-containing monomer, a terminal double bound-containing monomer, or a combination of a N-vinyl amine-containing monomer and a terminal double bound-containing monomer; wherein the second comonomer is present in a total second comonomer concentration of 50 mol % or less of the copolymer, and a zinc solid. The system further comprises mixing equipment configured to mix the aqueous base fluid, the polymeric additive, and the zinc solid and pumping equipment configured to pump the drilling fluid in the wellbore.

Additionally or alternatively, the system may include one or more of the following features individually or in combination. The system may further comprise a drill string and a drill bit; wherein the drilling fluid is pumped through the drill string and the drill bit. The system may further comprise a zinc-containing fluid that is a screen running fluid or a gravel packing fluid. The divalent brine may comprise a divalent salt selected from the group consisting of calcium bromide, calcium chloride, calcium nitrate, calcium iodide, zinc bromide, zinc chloride, zinc nitrate, zinc iodide, and any combination thereof. The second comonomer of the polymeric additive may be a comonomer selected from the group consisting of N-vinylpyrrolidone, N-vinylamides, acrylamide, methacrylamide, N-substituted acrylamides, methacrylamide, N-substituted methacrylamides, acrylates, methacrylates, acrylic acid, methacrylic acid, N-vinylamides, N-allylamides, vinyl alcohol, vinyl ethers, vinyl esters, allyl alcohol, allyl ethers, allyl esters, vinylpyridine, vinyl sulfonates, allyl sulfonates, vinylimidazole, allylimidazole, allylamine, diallylamine, allyltrimethylammonium halide, diallyldimethylammonium halide, or any combination thereof. The polymeric additive may comprise a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallylammonium halide, tetraallylethylene diamine, N-vinyl-3(E)-ethylidene pyrrolidone, ethylidene bis(N-vinylpyrrolidone), and any combination thereof. The polymeric additive may be present in the drilling fluid in a concentration of about 0.1% to about 10% w/v of the drilling fluid. The zinc solid may comprise zinc carbonate, zinc carbonate basic, zinc hydroxide, zinc oxide, zinc phosphate, zinc oxalate, zinc sulfide, or a combination thereof. The zinc solids may have a particle size in a range of about 10 nm to about 100 μm. The drilling fluid may have a density of about 9 lb/gal to about 20 lb/gal. The drilling fluid may have a density of about 14.5 lb/gal to about 19.5 lb/gal.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A drilling fluid for drilling a wellbore, comprising:
    a divalent brine aqueous base fluid comprising at least one dissolved divalent zinc salt;
    a polymeric additive that is a cross-linked copolymer comprising a first comonomer of 2-acrylamido-2-methylpropanesulfonic acid in a first comonomer concentration of at least 50 mol % of the copolymer, wherein the polymeric additive additionally comprises a second comonomer comprising a N-vinyl amine-containing monomer, a terminal double bound-containing monomer, or a combination of a N-vinyl amine-containing monomer and a terminal double bound-containing monomer, wherein the second comonomer is present in a total second comonomer concentration between 0.01 mol % to 50 mol % of the copolymer; and
    a zinc solid.

2. The drilling fluid of claim 1, wherein the divalent brine comprises a divalent salt selected from the group consisting of calcium bromide, calcium chloride, calcium nitrate, calcium iodide, zinc bromide, zinc chloride, zinc nitrate, zinc iodide, and any combination thereof.

3. The drilling fluid of claim 1, wherein the second comonomer of the polymeric additive is a comonomer selected from the group consisting of N-vinylpyrrolidone, N-vinylamides, acrylamide, methacrylamide, N-substituted acrylamides, methacrylamide, N-substituted methacrylamides, acrylates, methacrylates, acrylic acid, methacrylic acid, N-vinylamides, N-allylamides, vinyl alcohol, vinyl ethers, vinyl esters, allyl alcohol, allyl ethers, allyl esters, vinylpyridine, vinyl sulfonates, allyl sulfonates, vinylimidazole, allylimidazole, allylamine, diallylamine, allyltrimethylammonium halide, diallyldimethylammonium halide, and any combination thereof.

4. The drilling fluid of claim 1, wherein the polymeric additive comprises a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallylammonium halide, tetraallylethylene diamine, N-vinyl-3(E)-ethylidene pyrrolidone, ethylidene bis(N-vinylpyrrolidone), and any combination thereof.

5. The drilling fluid of claim 1, wherein the polymeric additive is present in the drilling fluid in a concentration of about 0.1% to about 10% w/v of the drilling fluid.

6. The drilling fluid of claim 1, wherein the zinc solid comprises zinc carbonate, zinc carbonate basic, zinc hydroxide, zinc oxide, zinc phosphate, zinc oxalate, zinc sulfide, or any combination thereof.

7. The drilling fluid of claim 1, wherein the zinc solids have a particle size in a range of about 10 nm to about 100 μm.

8. The drilling fluid of claim 1, wherein the drilling fluid has a density of about 9 lb/gal to about 20 lb/gal.

9. The drilling fluid of claim 1, wherein the drilling fluid has a density of about 14.5 lb/gal to about 19.5 lb/gal.

10. A method for drilling a wellbore in a subterranean formation, comprising:
providing a drilling fluid comprising:
a divalent brine aqueous base fluid comprising at least one dissolved divalent zinc salt,
a polymeric additive that is a cross-linked copolymer comprising a first comonomer of 2-acrylamido-2-methylpropanesulfonic acid in a first comonomer concentration of at least 50 mol % of the copolymer, wherein the polymeric additive additionally comprises a second comonomer comprising a N-vinyl amine-containing monomer, a terminal double bound-containing monomer, or a combination of a N-vinyl amine-containing monomer and a terminal double bound-containing monomer, wherein the second comonomer is present in a total second comonomer concentration between 0.01 mol % to 50 mol % of the copolymer, and
a zinc solid; and
drilling a wellbore through at least a portion of a subterranean formation with the drilling fluid.

11. The method of claim 10, further comprising introducing a zinc-containing fluid into the wellbore after the drilling fluid is introduced into the wellbore.

12. The method of claim 11, wherein the zinc-containing fluid is a screen running fluid or a gravel packing fluid.

13. The method of claim 10, wherein the subterranean formation comprises a reservoir comprising a hydrocarbon; wherein the wellbore is drilled through at least a portion of the reservoir; wherein the drilling fluid is circulated in the wellbore during the drilling of the reservoir.

14. The method of claim 10, wherein the drilling fluid has a density of about 9 lb/gal to about 20 lb/gal.

15. The method of claim 10, wherein the zinc solid comprises zinc carbonate, zinc carbonate basic, zinc hydroxide, zinc oxide, zinc phosphate, zinc oxalate, zinc sulfide, or any combination thereof.

16. A system for drilling a wellbore, comprising:
a drilling fluid comprising:
a divalent brine aqueous base fluid comprising at least one dissolved divalent zinc salt,
a polymeric additive that is a cross-linked copolymer comprising a first comonomer of 2-acrylamido-2-methylpropanesulfonic acid in a first comonomer concentration of at least 50 mol % of the copolymer, wherein the polymeric additive additionally comprises a second comonomer comprising a N-vinyl amine-containing monomer, a terminal double bound-containing monomer, or a combination of a N-vinyl amine-containing monomer and a terminal double bound-containing monomer, wherein the second comonomer is present in a total second comonomer concentration between 0.01 mol % to 50 mol % of the copolymer, and
a zinc solid;
mixing equipment configured to mix the aqueous base fluid, the polymeric additive, and the zinc solid; and
pumping equipment configured to pump the drilling fluid in the wellbore.

17. The system of claim 16, further comprising a drill string and a drill bit; wherein the drilling fluid is pumped through the drill string and the drill bit.

18. The system of claim 16, further comprising a zinc-containing fluid that is a screen running fluid or a gravel packing fluid.

19. The system of claim 16, wherein the second comonomer of the polymeric additive is selected from the group consisting of N-vinylpyrrolidone, N-vinylamides, acrylamide, methacrylamide, N-substituted acrylamides, methacrylamide, N-substituted methacrylamides, acrylates, methacrylates, acrylic acid, methacrylic acid, N-vinylamides, N-allylamides, vinyl alcohol, vinyl ethers, vinyl esters, allyl alcohol, allyl ethers, allyl esters, vinylpyridine, vinyl sulfonates, allyl sulfonates, vinylimidazole, allylimidazole, allylamine, diallylamine, allyltrimethylammonium halide, diallyldimethylammonium halide, and any combination thereof.

20. The drilling fluid of claim 16, wherein the drilling fluid has a density of about 9 lb/gal to about 20 lb/gal.

* * * * *